US006938180B1

(12) United States Patent
Dysert et al.

(10) Patent No.: US 6,938,180 B1
(45) Date of Patent: Aug. 30, 2005

(54) LOGICAL RESTORES OF PHYSICALLY BACKED UP DATA

(75) Inventors: David C Dysert, Holliston, MA (US); Robert A Boudrie, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 629 days.

(21) Appl. No.: 10/032,077

(22) Filed: Dec. 31, 2001

(51) Int. Cl.[7] ............................................. G06F 11/00
(52) U.S. Cl. ......................................... 714/6; 711/162
(58) Field of Search ............................. 714/6, 7, 8, 3, 714/42, 46, 13, 15, 54; 711/133, 134, 159, 711/162, 161

(56) References Cited

U.S. PATENT DOCUMENTS

| | | | |
|---|---|---|---|
| 5,907,672 A * | 5/1999 | Matze et al. ................... 714/8 |
| 6,047,294 A | 4/2000 | Deshayes et al. ........... 707/204 |
| 6,308,284 B1 * | 10/2001 | LeCrone et al. ............... 714/6 |
| 6,324,654 B1 * | 11/2001 | Wahl et al. ..................... 714/6 |
| 6,442,706 B1 * | 8/2002 | Wahl et al. ..................... 714/6 |
| 6,618,818 B1 * | 9/2003 | Wahl et al. ..................... 714/6 |
| 6,697,960 B1 * | 2/2004 | Clark et al. ................... 714/15 |
| 6,785,786 B1 * | 8/2004 | Gold et al. ................. 711/162 |

* cited by examiner

Primary Examiner—Nadeem Iqbal
(74) Attorney, Agent, or Firm—Daly, Crowley, Mofford & Durkee, LLP

(57) ABSTRACT

A method is performed with an enterprise storage system comprising disk storage and sequential storage media. Alternatively, systems, subsystems, and computer media containing encoded portions are disclosed. The method serves the data storage needs of a given client coupled to the enterprise storage system via a network. A physical device level backup is performed, backing up data from the disk storage to the sequential storage media, while minimizing demands on the client. The device level backup comprises a complete image backup of data in a host device as defined from a perspective of the given client. A logical restore of data is performed on a file by file basis from physically backed data on the sequential storage media. The logical restore involves locating files requested by the client on the sequential storage media and recovering the files from the sequential storage media. The files comprise files defined in accordance with a files system defined by the client.

18 Claims, 5 Drawing Sheets

LOGICAL RESTORES OF PHYSICALLY BACKED UP DATA

BACKGROUND OF THE INVENTION

COPYRIGHT NOTICE

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

1. Field of the Invention

The present invention, in certain respects, relates to enterprise storage systems and backup and recovery processes. In other respects, the present invention relates to certain techniques for improving performance and speed of data backup and recovery processes.

2. Description of Background Information

Enterprise storage systems provide enterprise level computer systems and networks with a readily accessible, safe storage media for their mission-critical data. An internet service provider's (ISP's) computer infrastructure and the human resources and accounting systems for a large enterprise are a few examples of enterprise level systems. To protect the data, such enterprise storage systems replicate data on a primary disk (or volume) with one or more mirror disks (or volumes). Additionally, data on the primary disk—to which the enterprise application has direct and immediate read and write access—is periodically and/or intermittently backed up to sequential storage media (e.g., tapes). If data on the primary (and mirrors) is lost or corrupted, or otherwise reproduced, it can be recovered from the sequential storage.

It is important that such backup and recovery processes are executed quickly (with minimal latency) and without any disruptive or otherwise undesired use of overhead and system resources of the computers involved (e.g., the client system, the network, and the data manager of the enterprise storage system).

Enterprise storage systems such as those described above perform data backup processes and restore processes. Disk level backups and restores (otherwise referred to as physical backups and restores) involve the backing up or the restoring of a raw "image" of the entire disk (as seen from the perspective of the client—e.g., a client's operating system may identify a given disk logically as a host device). File-level backups and restores (otherwise referred to as logical backups and restores) require file mapping, a process by which each file to be backed up, that may be located at various physical locations on a disk (or separate disks) is mapped (i.e., tracked using meta data) when it is sent to the backup storage devices.

Device backups involve backing up all data of a given device; e.g., the device may be defined as the primary disk, which is replicated in the mirror disk. Conventionally, a restore of a device backup must restore the entire device, since file-level information is not tracked during a device backup. Raw filesystem backups also involve backing up the entire device, and restores of such a backup require restoring of the entire device. File level backups backup files as files, i.e., with file level granularity.

Device level backups and raw filesystem backups are faster than file level backups, and thus can be easier on the user system and its database application; i.e., they require less processing involvement by the user system. In contrast, file level backups can require substantial participation by applications and operating systems on the user system, and thereby reduce the performance of the user system. When a file level backup is performed, the user system must keep track of components of data files typically scattered and stored in non-contiguous segments spanning different disks within the storage system.

SUMMARY OF THE INVENTION

The present invention is presented to serve one or more of the objects and advantages as set forth herein. In certain respects, the present invention is provided to improve upon disk backup and recovery processes allowing the recovery of file by file data. A method is presented for improving the performance of the backup and recovery process.

The benefits of speed of a physical backup are realized, while giving the user flexibility in being able to later restore data at a file level.

In accordance with one aspect of the invention, an enterprise storage system is provided. Alternatively, the invention may be directed to a method, or any part or portion of the system or method. The invention may also be embodied in the form of computer-readable media encoded to perform all or any subset of the functions of such a system or method.

In one embodiment or aspect, a method is performed with an enterprise storage system comprising disk storage and sequential storage media. The method serves the data storage needs of a given client coupled to the enterprise storage system via a network. A physical device level backup is performed, backing up data from the disk storage to the sequential storage media, while minimizing demands on the client. The device level backup comprises a complete image backup of data in a host device as defined from a perspective of the given client. A logical restore of data is performed on a file by file (of user selected files) basis from physically backed data on the sequential storage media. The logical restore involves locating files requested by the client on the sequential storage media and recovering the files from the sequential storage media. The files comprise files defined in accordance with a files system defined by the client.

The physical device backup may comprise more specific acts. For example, in another aspect of the invention, a data manager obtains a host device map from the client. The data manager obtains a file system map from the client. The data manager copies raw data of the host device on the disk storage to the sequential storage and creates a restore mapping. The restore mapping identifies sequential bit position information of the sequential storage media and tracking correspondence among such bit positions to given files and bit positions within the given files. The host device map and the file system map are persisted on the disk storage.

The logical restore may comprise more specific acts. For example, in another aspect of the invention, a request for a restore of given files is received—by the data manager in one embodiment. A tape selection map is created, with blocks to be restored ordered so as to correspond to tape positions monotonically ascending. The method obtains, from the client, destination information including target block locations for all blocks of the files being restored. A refreshed file system map is prepared, describing preallocated target locations to be reserved on the disk storage. Source block information is correlated with target block information, and an instructive consolidated list is created, including (i) block skip information directing that certain numbers of blocks be skipped over and not restored at certain points in the restore pass on the sequential storage media and including (ii) a destination block for each of the blocks preceeding and succeeding the blocks to be skipped. Upon restore, a single pass is made on the sequential storage media, restoring all requested data files.

BRIEF DESCRIPTION OF THE DRAWINGS

Non-limiting embodiments of the present invention are described in the detailed description below, by reference to the noted drawings, in which the like reference numerals represent similar parts throughout the several views of the drawings, and wherein.

DETAILED DESCRIPTION

Figure 1:
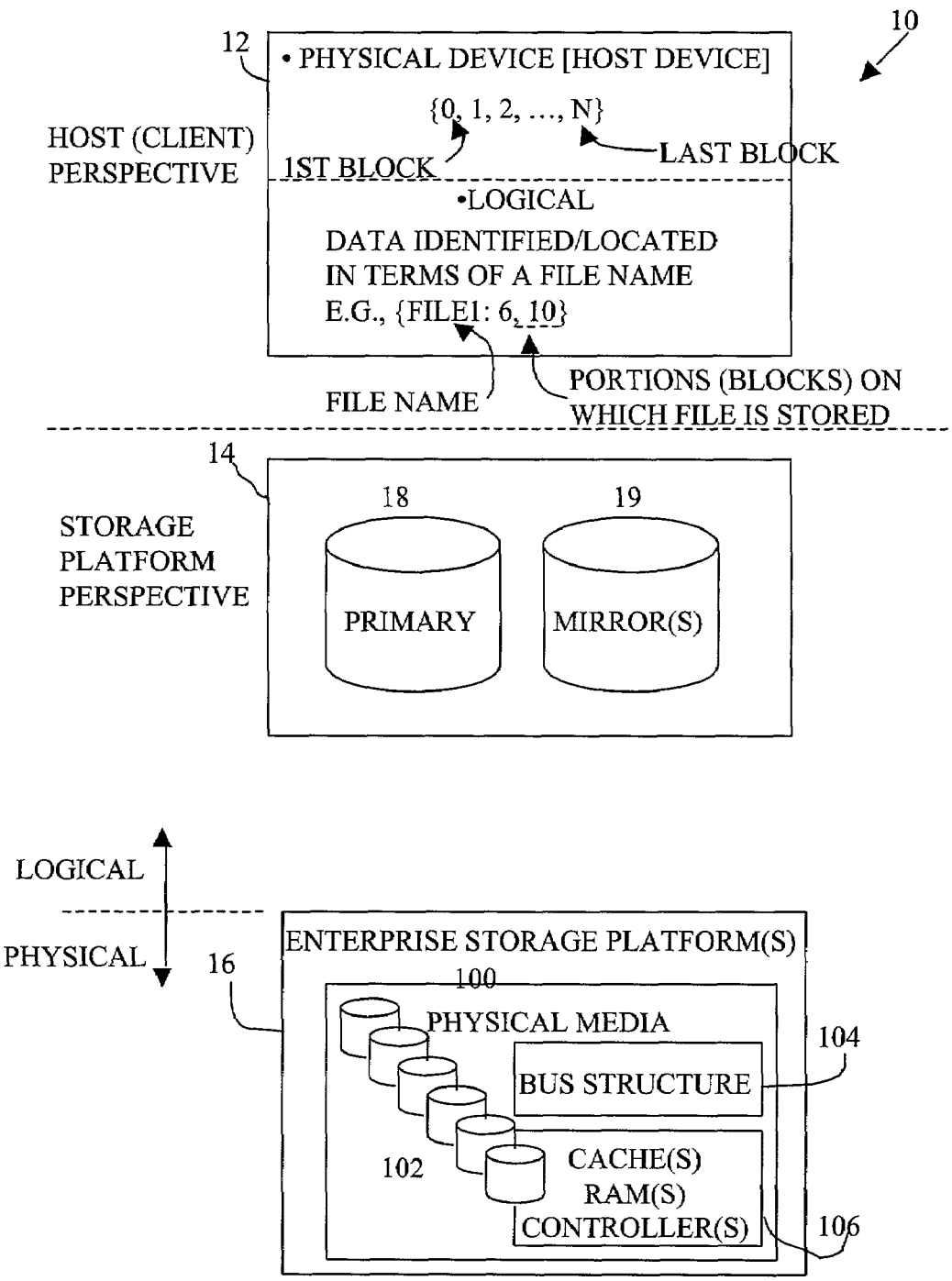
FIG. 1 is a diagram that shows the relationship among different data structure representation schemes in an enterprise storage system.

FIG. 1 is a block diagram that presents some of the data structure nomenclature for a disk-oriented enterprise storage system. At the physical level, a given enterprise storage platform 16 (e.g., a Symmetrix system) may have a physical media portion 100, that comprises physical hard disks 102, a bus structure 104, and other devices 106, including one or more caches, RAM, and one or more controllers.

Data stored in the physical media portion 100 may be stored on an actual hard disk 102 or in a cache or RAM. Regardless of where data is at a given time within physical media portion 100 of enterprise storage platform 16, its location at another (logical) level, i.e., from the perspective of the storage platform, may be in terms of disk storage 14, and thus more specifically one or both of a primary disk (or volume) 18 and one or more mirror disks (or volumes) 19. From the perspective of the client (or host), data may be stored anywhere within a storage entity called (in terms used by the client) a physical device. Such a storage entity may also be called, e.g., a host device or a physical volume. At the physical device level, the client will represent data in terms of its being located within given blocks sequentially ordered from the beginning of the physical device (at block 0) until the end of the physical device (at block N).

From the perspective of the client (or host), the stored data may be tracked in terms of individual files and blocks forming such files. Such a representation is referred to as a logical level representation. With such a representation, data is identified and located in terms of its file name. For example, a file called "file1" may comprise blocks located at block numbers 6 and 10 in terms of the physical device. Accordingly, with a logical file level representation, such a file is represented as {file1:6, 10}.

Figure 2:
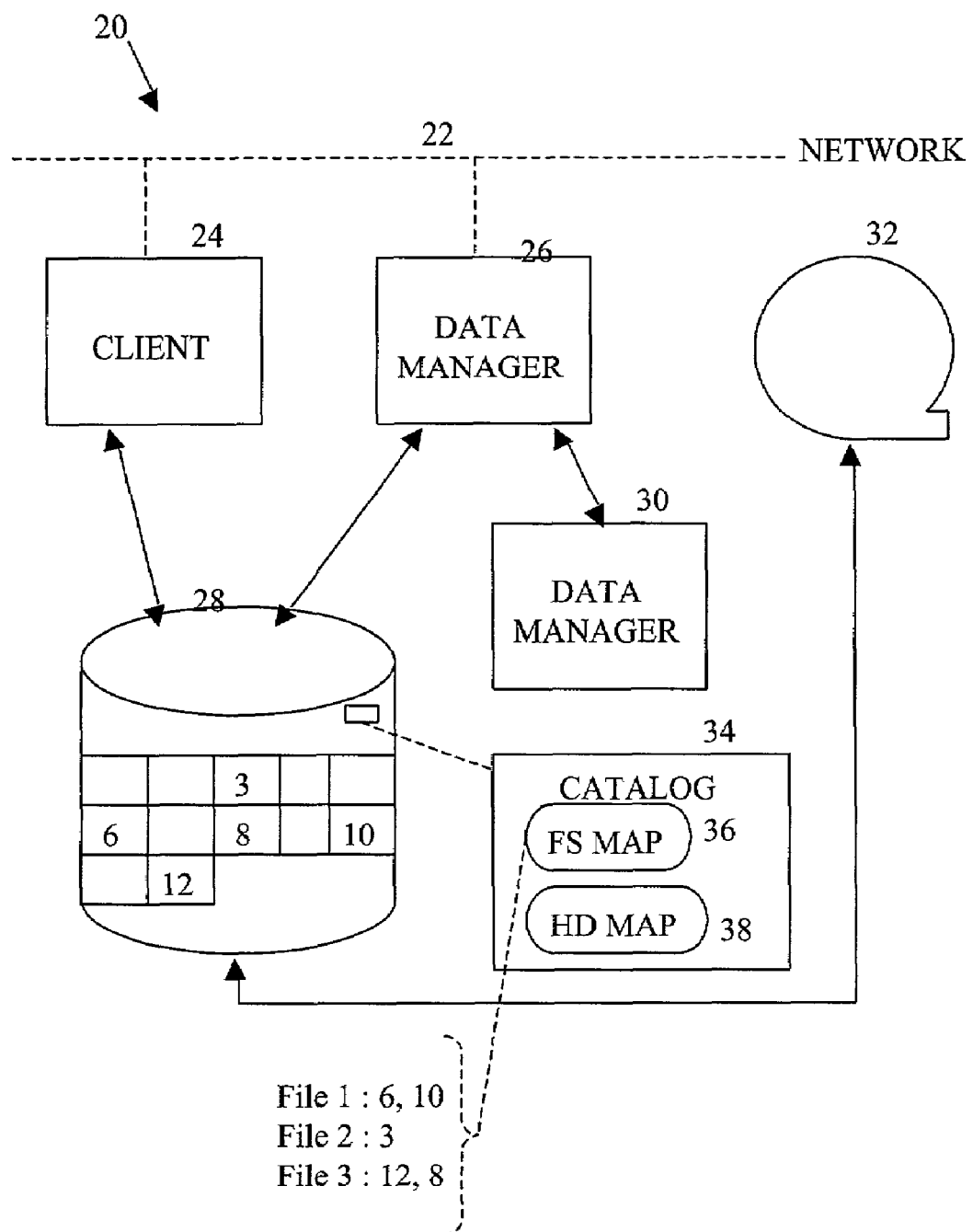
FIG. 2 is a block diagram of a backup/restore system for enterprise storage, the client having real-time access to the data in disk storage.

FIG. 2 is a simplified, functional/data flow diagram based on one embodiment of an enterprise storage system 20 involved in backup and restore of data from a disk storage 28 to and from one or more backup storage devices 32. In the illustrated system, a backup storage device (or plural backup storage devices) 32 is connected to a data manager 26 (a connecting line is not shown in FIG. 2, to avoid distraction from the purpose of that Figure, which is primarily to illustrate ultimate data flow connections rather than the physical routes of such data flow). Data manager 26 is connected to an enterprise storage platform (not shown specifically) (or plural collocated or remote enterprise storage platforms) comprising disk storage 28 and to client 24 (a host system). In the illustrated system, each of data manager 26 and client 24 is linked via a network 22, and is connected directly to at least one local enterprise storage platform (not specifically shown) via one or more channels (e.g., SCSI channels) (not shown).

Backup storage device 32 may comprise, e.g., a tape library unit. Data manager 26 may comprise, e.g., a Sun™ microstation running EDM™ software (EMC data manager software). An enterprise storage platform may, e.g., comprise one or more plural local/collocated or remote Symmetrix™ integrated cached disk arrays™ (a remote disk array may be a Symmetrix Remote Data Facility (SRDF)). Client 24 may comprise a host computer or a host computer network, which includes a database application.

The client retrieves and stores, in real time, data from and to disk storage 28. The data on disk storage 28 may comprise data on a primary disk (not specifically shown) mirrored by a mirror disk (not specifically shown). A mirror disk may comprise one or a combination of a RAID type of mirror and a mirror—such as a Business Continuance Volume (BCV).

In operation, client 24 accesses, processes, and stores data in or on disk storage 28. Client 24 is interfaced to disk storage 28 and to data manager 26, which controls, among other functions, backup operations where data on the disk storage 28 is backed up to one or more backup storage devices 32. Generally, a data manager may be capable of performing several different types of backup operations, including, e.g., a physical device backup, a raw file system backup, and a file-level backup. If the backup is a mirrored backup, the data is copied from the mirror disk to the backup storage device, while the user system keeps access to the primary disk. If the backup is not a mirrored backup, the data is copied directly from the primary disk to the backup storage device.

Physical device backups involve backing up all data of a given device; e.g., the device may be defined as the primary disk, which is replicated in the mirror disk. A restore of a device backup will typically restore the entire device, since file-level information is not usually tracked during a device backup. Raw filesystem backups also involve backing up the entire device, and restores of such a backup require restoring of the entire device. However, a raw filesystem backup, provided by the embodiments presented herein, is different from a device backup in that a user can browse for a certain file using a restore GUI; with a physical device backup such browsing is not possible. File level backups backup files as files, i.e., with file level granularity.

Physical device level backups and raw filesystem backups are faster than file level backups, and thus can be easier on the user system and its database application, i.e., the require less processing involvement by the user system. In contrast, file level backups can require susbstantial participation by applications and operating systems on the user system, and thereby reduce the performance of the user system. When a file level backup is performed, the user system must keep track of components of data files typically scattered and stored in non-contiguous segments spanning different disks within the storage system.

FIG. 2 further shows, as part of disk storage 28, schematic representations of blocks of a host device. The blocks with numbers in them correspond to block numbers in terms of the file system map. That is, the disk storage has files file 1, file 2, and file 3, identified in accordance with the host's file system (FS), e.g., as {file 1: 6, 10; file 2: 3; file 3: 12, 8}. In terms of the sequential block positions in the host device (HD) schematically shown as part of disk storage 28, block 3 of file 2 of the FS is in the third block of the HD.

The three files are depicted in FIG. 2, in text coupled with FS map 36, which forms part of a catalog 34. Catalog 34 further comprises an HD map 38.

In operation, the system illustrated in FIG. 2 serves the data storage needs of a given client coupled to an enterprise storage system (comprising data manager 26 and disk storage 28) via a network 22.

Figure 3:
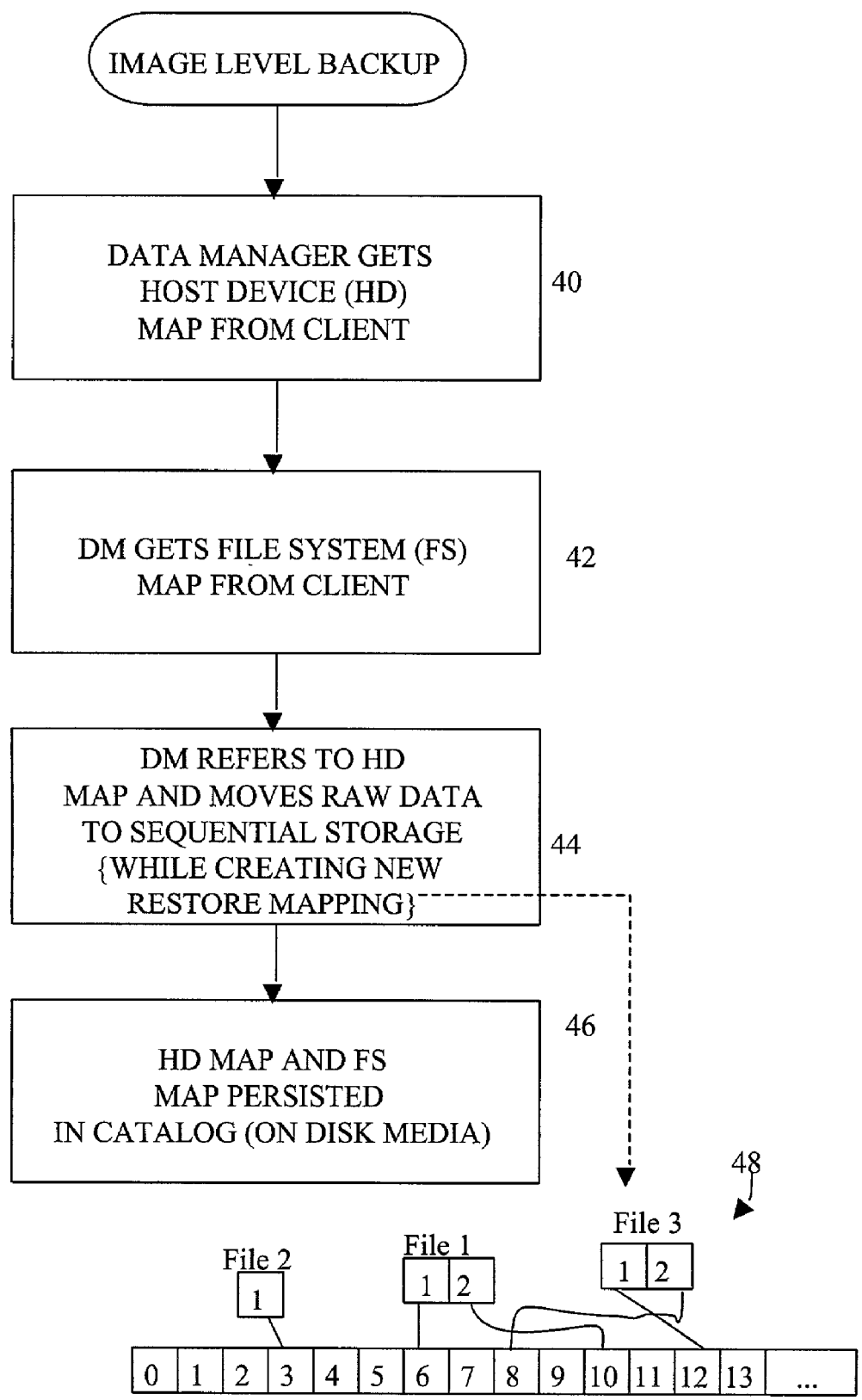
FIG. 3 is a flow chart of a physical device backup.

Per the flow chart in FIG. 3, a physical device level backup may be performed, backing up data from the disk storage 28 to the sequential storage media 32, while minimizing demands on the client 24. The device level backup comprises a complete image backup of data in a host device as defined from a perspective of the given client 24.

Figure 4:
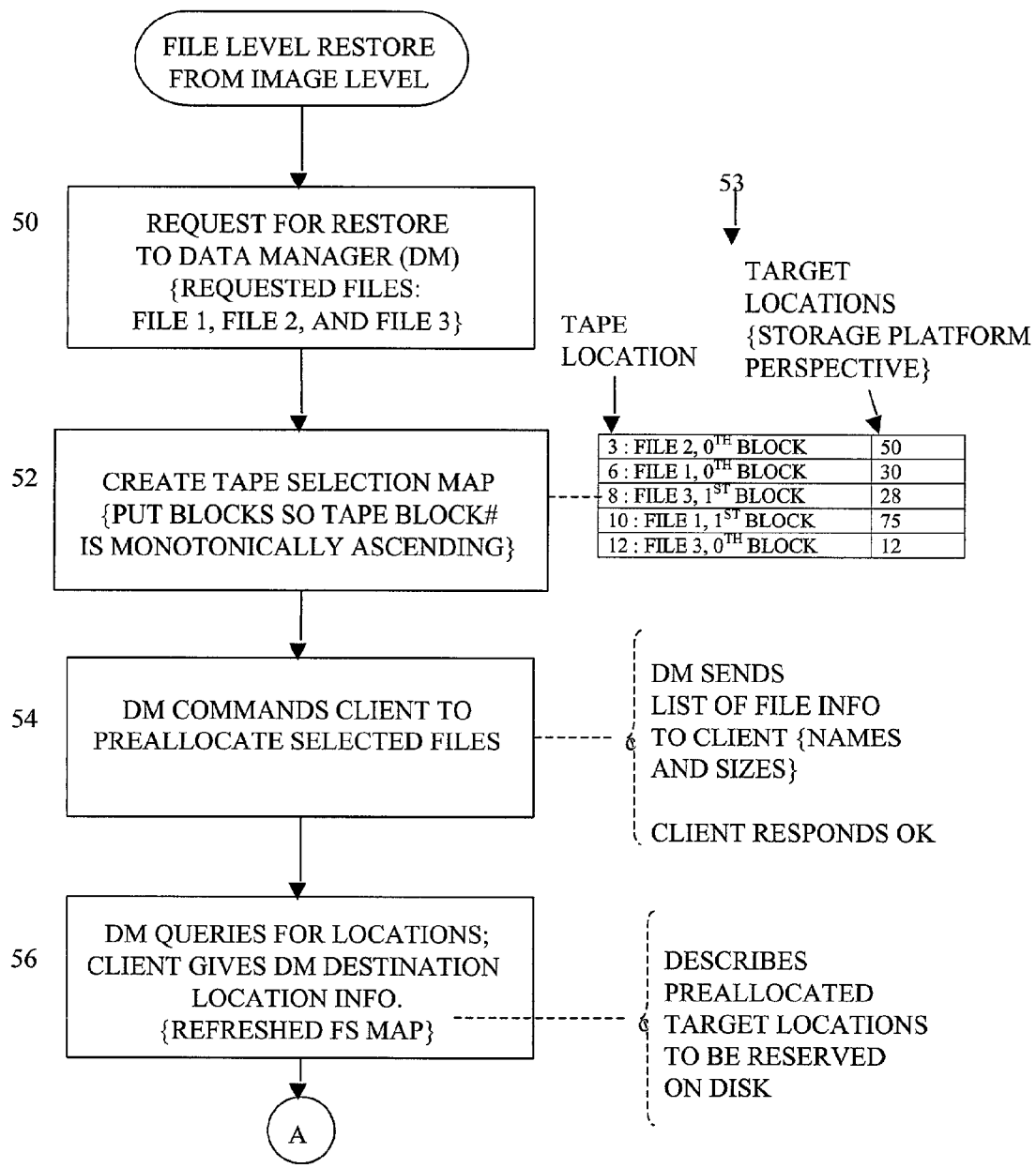
FIGS. 4 and 5 are a flow chart of a file level restore from a physical device backup.
Figure 5:
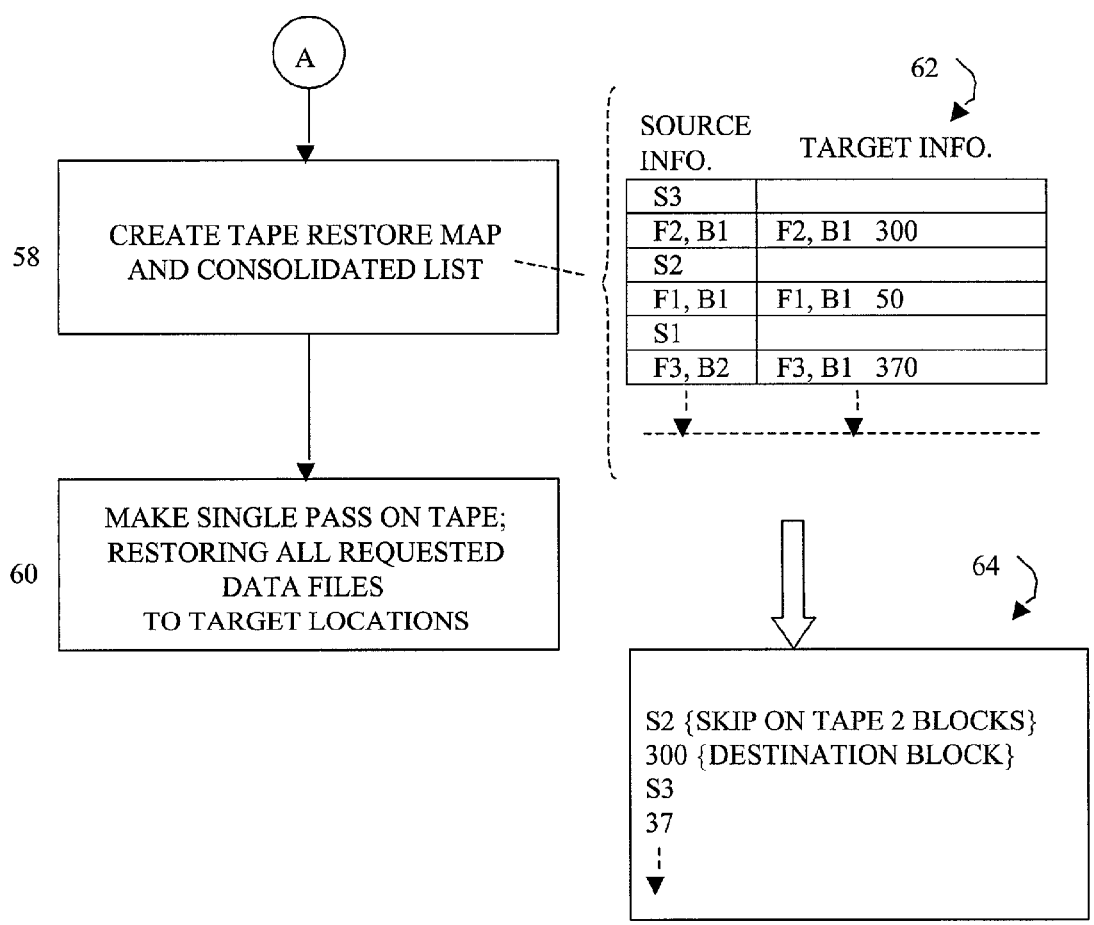

Per the flow chart in FIGS. 4 and 5, A logical restore of data is performed on a file by file basis from physically backed data on the sequential storage media 32. The logical restore involves locating files requested by the client on the sequential storage media 32 and recovering the files from the sequential storage media 32. The files comprise files defined in accordance with a files system defined by the client 24.

As shown in FIG. 3, when performing a physical device backup, during an initial act 40, a data manager obtains a host device map from the client. Then, in act 42, the data manager obtains a file system map from the client.

In act 44, the data manager copies raw data of the host device on the disk storage to the sequential storage and creates a restore mapping. As shown at 48, the restore mapping identifies sequential bit position information of the sequential storage media and tracks correspondence among such bit positions to given files and bit positions within the given files. For example, Bit 1 of file 2 is associated with bit position 3 on tape.

In act 46, the host device map and the file system map are each persisted on the disk media.

As shown in FIGS. 4 and 5, when performing a file level restore from physical device backup, in an initial act 50, a request is received by the data manager (e.g., from an operator or from the client system) for a restore of given files {File 1, File 2, and File 3}. In act 52, a tape selection map is created, with blocks to be restored ordered so as to correspond to tape positions monotonically ascending. See the illustrated tape selection map 53 in FIG. 4. In act 54, data manager obtains, from the client, destination information including target block locations for all blocks of the files being restored. The data manager does this by commanding the client to preallocate the selected files. In act 56, the data manager then queries the client for destination information and creates a refreshed FS map. The refreshed file system map describes preallocated target locations to be reserved on the disk storage.

In act 58, the data manager correlates source block information with target block information and creates an instructive consolidated list including (i) block skip information directing that certain numbers of blocks be skipped over and not restored at certain points in the restore pass on the sequential storage media and including (ii) a destination block for blocks preceeding and succeeding the blocks to be skipped. See the exemplary, simplified, tape restore map 62 and the consolidated list 64, in the right hand portion of FIG. 5.

In act 60, a single pass is made on the sequential storage media, restoring all requested data files.

This process may also support a "raw restore" of the entire file system, by specifying all files instead of a subset of specific files. Thus, the process can serve as a high performance disaster recovery process.

The processing performed by, e.g., the data manager, the enterprise storage platform, the user system, and the database application, may be performed by individual or shared general purpose computers or in connection with specialized processing computers. Such processing may be performed by individual platforms or by distributed processing platforms. In addition, such processing and functionality can be implemented in the form of special purpose hardware or in the form of software being run by a general purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method performed with an enterprise storage system comprising disk storage and sequential storage media, the method serving data storage needs of a given client coupled to the enterprise storage system via a network, the method comprising:

performing a physical device level backup of data from the disk storage to the sequential storage media, while minimizing demands on the client, the device level backup comprising a complete image backup of data in a host device as defined from a perspective of the given client, wherein the physical device backup comprises:
a data manager obtaining a host device map from the client;
the data manager obtaining a file system map from the client;
the data manager copying raw data of the host device on the disk storage to the sequential storage and creating a restore mapping, the restore mapping identifying sequential bit position information of the sequential storage media and tracking correspondence among such bit positions to given files and bit positions within the given files; and
persisting the host device map and the file system map on disk media; and performing a logical restore of data on a file by file basis from physically backed data on the sequential storage media, the logical restore involving locating files requested by the client on the sequential storage media and recovering the files from the sequential storage media, the files comprising files defined in accordance with a files system defined by the client.

2. The method according to claim 1, wherein the logical restore comprises:
receiving a request for a restore of given files;
creating a tape selection map, with blocks to be restored ordered so as to correspond to tape positions monotonically ascending;

obtaining from the client destination information including target block locations for all blocks of the files being restored;
prepare a refreshed file system map describing preallocated target locations to be reserved on the disk storage;
correlate source block information with target block information and create an instructive consolidated list including (i) block skip information directing that certain numbers of blocks be skipped over and not restored at certain points in the restore pass on the sequential storage media and including (ii) a destination block for blocks preceding and succeeding the blocks to be skipped; and
making a single pass on the sequential storage media, restoring all requested data files.

3. An enterprise storage system, comprising:
a disk storage device, the disk storage device capable of storing a plurality of files provided by a client in communication with the enterprise storage system;
a sequential storage media capable of storing a backup of at least a portion of the plurality of files;
a data manager in communication with the sequential storage media and the disk storage device, the data manager capable of communicating with a client to store the plurality of files on the disk storage device and to store a backup of at least a portion of the plurality of files on the sequential storage media, wherein the data manager includes computer-readable instructions to enable:
receiving a request for a restore of a portion of the plurality of files;
creating a sequential media selection map, the sequential media selection map comprising blocks to be restored ordered so as to correspond to monotonically ascending positions on the sequential storage media;
obtaining destination information including target block locations for at least a portion of the blocks of the files being restored;
preparing a refreshed file system map;
correlating source block information with target block information;
creating a list comprising (i) block skip information directing that certain numbers of blocks be skipped over and not restored at certain points in the restore pass on the sequential storage medium and further comprising (ii) a destination block for blocks preceding and succeeding the blocks to be skipped; and
making a single pass on the sequential storage medium, restoring at least a portion of the requested data files in accordance with the list.

4. The system of claim 3, wherein the data manager further comprises instructions to enable requesting a preallocation of the files to be restored.

5. The system of claim 3, wherein the refreshed file system map describes preallocated target locations to be reserved on the disk storage.

6. The system of claim 3, wherein the data manager further comprises instructions to enable receiving a request for a restore of substantially all files of the plurality of files.

7. The system of claim 3, wherein the disk storage device further comprises at least one of a file system map and a hard disk map, the hard disk map comprising a map of the disk storage device.

8. The system of claim 7, wherein the data manager further comprises instructions to enable moving raw data from the disk storage device to the sequential storage media in accordance with the hard disk map.

9. The system of claim 8, wherein the data manager further comprises instructions to enable creating a restore map, the restore map identifying sequential bit position information of the sequential storage media and tracking correspondence among such bit positions to files and bit positions within the plurality of files.

10. A method for performing a physical device level backup of data from disk storage to a sequential storage media, the method comprising:
obtaining a host device map;
obtaining a file system map;
copying raw data of a host device on the disk storage to a sequential storage media;
creating a restore map, the restore map identifying sequential bit position information of the sequential storage media and tracking correspondence among such bit positions to a plurality of files and bit positions within the plurality of files; and
persisting the host device map and the file system map on a disk media.

11. The method of claim 10, wherein at least one of the host device map and file system map is obtained from a client.

12. The method of claim 10 further comprising enabling a search within the sequential storage media for a particular file within the plurality of files.

13. A method of performing a logical restore of data on a file by file basis from physically backed data on a sequential storage media, the method comprising:
receiving a request for a restore of a plurality of files;
creating a sequential media selection map, the sequential media selection map comprising blocks to be restored;
obtaining destination information including target block locations for all blocks of the files being restored;
preparing a refreshed file system map describing preallocated target locations to be reserved on a disk storage device;
correlating source block information with target block information;
creating a list comprising (i) block skip information directing that certain numbers of blocks be skipped over and not restored at certain points in the restore pass on the sequential storage media and further comprising (ii) a destination block for blocks preceding and succeeding the blocks to be skipped; and
making a single pass on the sequential storage media, restoring all requested data files in accordance with the list.

14. The method of claim 13 wherein the blocks to be restored in the sequential media selection map are ordered so as to correspond to monotonically ascending positions on the sequential storage media.

15. The method of claim 13 wherein the destination information is obtained from a client and wherein the method further comprises commanding the client to preallocate the plurality of files to be restored.

16. The method of claim 13, wherein the request for restore of plurality of files is received from a client and wherein the plurality of files comprise files defined in accordance with a file system defined by the client.

17. The method of claim 13, wherein the plurality of files comprises substantially all files stored on the sequential storage media.

18. The method of claim 13, further comprising creating a sequential media restore map.

* * * * *

UNITED STATES PATENT AND TRADEMARK OFFICE
CERTIFICATE OF CORRECTION

PATENT NO. : 6,938,180 B1
DATED : August 30, 2005
INVENTOR(S) : Dysert et al.

It is certified that error appears in the above-identified patent and that said Letters Patent is hereby corrected as shown below:

Column 4,
Line 52, reads "the require" and should read -- they require --.
Line 64, reads "files file 1," and should read -- files, file 1 --.

Signed and Sealed this

Seventeenth Day of January, 2006

JON W. DUDAS
*Director of the United States Patent and Trademark Office*